(12) United States Patent
Benazzi et al.

(10) Patent No.: US 6,984,309 B2
(45) Date of Patent: Jan. 10, 2006

(54) ZEOLITE ZSM-48 CATALYST AND METHOD FOR IMPROVING PARAFFINIC FEEDSTOCK FLOW POINT

(75) Inventors: Eric Benazzi, Chatou (FR); Nathalie Marchal-George, Saint Genis Laval (FR); Johan Martens, Huldenberg (BE); Marion Claude, Leuven (BE)

(73) Assignee: Institut Francais du Petrole, Rueil-Malmaison (FR)

( * ) Notice: Subject to any disclaimer, the term of this patent is extended or adjusted under 35 U.S.C. 154(b) by 142 days.

(21) Appl. No.: 10/220,427

(22) PCT Filed: Mar. 2, 2001

(86) PCT No.: PCT/FR01/00617

§ 371 (c)(1),
(2), (4) Date: Mar. 17, 2003

(87) PCT Pub. No.: WO01/64339

PCT Pub. Date: Sep. 2, 2001

(65) Prior Publication Data

US 2003/0166452 A1 Sep. 4, 2003

(30) Foreign Application Priority Data

Mar. 2, 2000 (FR) .................................. 00 02803

(51) Int. Cl.
*B01J 29/06* (2006.01)
(52) U.S. Cl. ................ 208/109; 208/108; 208/111.01; 208/111.35; 502/64; 502/66; 502/74
(58) Field of Classification Search .................. 502/64, 502/66, 74; 208/109, 108, 111.01, 111.35
See application file for complete search history.

(56) References Cited

U.S. PATENT DOCUMENTS

| | | | |
|---|---|---|---|
| 4,882,307 A | | 11/1989 | Tsao |
| 5,098,685 A | * | 3/1992 | Casci et al. ................. 423/708 |
| 5,122,489 A | | 6/1992 | Dessau |
| 2004/0065585 A1 | * | 4/2004 | Benazzi et al. ............... 208/27 |
| 2004/0134834 A1 | * | 7/2004 | Benazzi et al. ............... 208/58 |

FOREIGN PATENT DOCUMENTS

| | | |
|---|---|---|
| EP | 0 306 237 | 3/1989 |
| JP | 11 047593 | 2/1999 |
| WO | WO 99 41333 | 8/1999 |

OTHER PUBLICATIONS

Japanese Patent Abstract No. JP 11 047593 dated Feb. 23, 1999.

Meriaudeau, P. et al., Comparative evaluation of the catalytic properties of SAPO-31 . . . , *Journal of Catalysis*, vol. 185, No. 2, Jul. 25, 1999, pp. 435-444.

* cited by examiner

*Primary Examiner*—Christina Johnson
(74) *Attorney, Agent, or Firm*—Millen White Zelano & Branigan, P.C.

(57) ABSTRACT

The invention pertains to a catalyst that consists of a substrate made of at least one matrix and at least one zeolite that is selected from the group composed of the zeolites ZSM-48, EU-11, and ZBM-30, whereby, at the level of the zeolite, at least one noble metal of Group VIII is deposited on said substrate. The noble metal is preferably located on the outer surfaces of the zeolite crystals, and more preferable at the mouths of pores. The invention also pertains to a process for preparing the catalyst and utilizing the catalyst to treat hydrocarbon feedstocks, and especially for improving their pour points.

21 Claims, No Drawings

ZEOLITE ZSM-48 CATALYST AND METHOD FOR IMPROVING PARAFFINIC FEEDSTOCK FLOW POINT

This invention pertains to a catalyst based on zeolites ZSM-48, EU-2, EU-11, or ZBM-30, a process for preparing said catalyst, and a process for improving the pour points of feedstocks that contain linear and/or slightly branched, long (generally more than 10 carbon atoms) paraffins, especially for high-yield conversion of feedstocks that have elevated pour points into at least one fraction that has a low pour point and a high index of viscosity.

PRIOR ART

High-quality lubricants are of vital importance for modern machines, automobiles, and trucks to operate properly. However, the number of paraffins that come directly from petroleum, untreated, and that have properties good enough to make them good lubricants is very small compared to the growing demand in this regard.

Heavy petroleum fractions with high contents of linear or slightly branched paraffins have to be treated in order to obtain good-quality base oils, and this has to be done with optimum yields by an operation that is aimed at eliminating the linear or very slightly branched paraffins from the feedstocks that will then be used as base oils or as kerosene or jet fuel.

As a matter of fact, high-molecular-weight paraffins that are linear or very slightly branched and that are present in oils or in kerosene or jet fuel lead to high pour points and thus to solidification phenomena for low-temperature applications. In order to bring down the values of the pour points, these linear or very slightly branched paraffins need to be partially or completely eliminated.

This operation can be carried out by extraction using solvents such as propane or methyl ethyl ketone; this is then referred to as propane or methyl ethyl ketone (MEK) dewaxing. These techniques, however, are expensive, time-consuming, and not always easy to implement.

Another method is catalytic treatment, and, taking into account their shape selectivity, the zeolites are among the most used catalysts.

Catalysts that are based on zeolites such as ZSM-5, ZSM-11, ZSM-12, ZSM22, ZSM-23, ZSM-35 and ZSM-38 were described for their use in these processes. The applicant focused research efforts on developing catalysts for improving the pour points of feedstocks.

OBJECT OF THE INVENTION

The invention pertains to a catalyst that contains at least one matrix, at least one noble metal of Group VIII and at least one zeolite that is selected from among the group that is composed of zeolites ZSM-48, EU-2, EU-11 and ZBM-30, a catalyst in which at least a portion of the noble metal is deposited at the level of the zeolite on the substrate that contains at least one matrix and at least one of said zeolites. At least a portion of the noble metal is preferably deposited essentially on the surface of the zeolite.

Generally at least 10% of the noble metal is deposited at the level of the zeolite, advantageously at least 20%. At most 90% of the noble metal is preferably deposited on the zeolite.

When not all of the noble metal(s) is deposited at the level of the zeolite, at least one other portion of the noble metal is found at the level of the matrix, either included in the matrix (by mixing before the substrate is prepared) or deposited on the matrix after the substrate is prepared.

The catalyst can contain one or more noble metals. When a single noble metal is present, it is located completely or partially at the level of said zeolite. One other portion (or the other portion) is located at the level of the matrix.

When several noble metals are present in the catalyst, the zeolite and the matrix can contain different or identical metals.

The invention also pertains to a process for preparing said catalyst, in which:

a) a substrate is prepared by mixing at least one matrix and at least one of said zeolites;

b) at least a portion of the noble metal is deposited on said substrate by bringing a solution of at least one cation complex of said metal into contact with said substrate in order to deposit said noble metal on the zeolite;

c) the substrate containing said noble metal at the zeolite is optionally subjected to heat treatment.

In cases where not all of the noble metal is used in stages a) and/or b), in stage b') the remainder of the noble metal is deposited on the matrix by bringing the substrate into contact with a solution of at least one anion complex of said metal. Stage b') can be carried out before stage b), in which case stage b') is advantageously followed by a heat treatment, for example under air or oxygen, at a temperature of between 200° C. and 600° C., or 300° C. and 600° C., preferably between 250° C. and 550° C. or 350° C. and 550° C. over a period of generally 30 minutes to 10 hours and preferably 1 to 4 hours so as to break down the salts of the metals that are deposited on the substrate and to obtain an oxide form of the metals.

Stage b') can also be carried out after stage b) and before stage c).

At the end of stage b) or stage b'), treatment under hydrogen is carried out in order to transform the element of Group VIII into a metal and thus to obtain an active metal phase. The procedure for this treatment under hydrogen includes, for example, a slow temperature rise (for example, between approximately 1 and 5° C./min.) under a stream of pure or diluted hydrogen up to the maximum reduction temperature of generally between approximately 300° C. and 700° C., preferably between approximately 300° C. and 700° C., preferably between approximately 300° C. and 650° C., followed by holding at this temperature for generally 1 to 10 hours, and preferably for 1 to 5 hours. This treatment under hydrogen can be carried out in situ in the catalytic dewaxing reactor or ex situ before the reactor is charged.

The invention also has as its object a process for improving the pour point of a feedstock that contains paraffins that have generally more than 10 carbon atoms, in which the feedstock to be treated is brought into contact with the above-described catalyst. The procedure generally runs at a temperature of between 170° C. and 500° C., a pressure of between 1 and 250 bar, and an hourly volumetric flow rate of between 0.05 and 100 $h^{-1}$, in the presence of hydrogen at a ratio of 50 to 2000 1/1 of feedstock.

Said catalyst has an elevated activity and an elevated dewaxing selectivity (improvement of pour point), i.e., elevated yields in terms of oil fraction. Without necessarily adhering to any particular theory, it seems that the particularly high oil-fraction yields that are obtained using the catalysts of this invention would be due to the improved proximity between the acid sites of the zeolite that are present at the pore mouths and the metal particles that are deposited there (close to the pore mouths or, to some extent, in the pore mouths).

This procedure makes it possible advantageously to convert a feedstock having a high pour point into a(n) (oil) mixture that has a lower pour point and a high viscosity index. This process can also be used to lower the pour points of, for example, gas oils.

DETAILED DESCRIPTION OF THE INVENTION

The zeolites that are part of the composition of the catalysts according to the invention fall into the group composed of the zeolites EU-2, ZSM-48, EU-11, and ZBM-30. The zeolite EU-2 is described in the article in Journal of Chemical Research, 192 (1985) and Patent GB 2077709A (corresponding to U.S. Pat. No. 4,741,891; U.S. Pat. No. 4,836,996; U.S. Pat. No. 4,876,412; U.S. Pat No. 5,098,685); the zeolite ZSM-48 is described in the article Zeolites 5, 355 (1985) and Patents EP-A-23089, U.S. Pat No. 4,397,827, EP-A-15132, EP-A-142317, and U.S. Pat No. 5,961,591; the zeolite EU-11is described in the article in the Journal of Catalysis, 85, 135 (1985); and, finally, the zeolite ZBM-30 is described in Patent EP-A-46504.

The similarity among the structures of the zeolites EU-2, ZSM-48, EU-11, and ZBM-30 is described and studied in Chapter VIII, P. 275 of Volume 33 of the series Studies in Surface Science and Catalysis, entitled "Synthesis of High Silica Aluminosilicate Zeolites" of 1987, as well as in the documents that are cited in this chapter. Structural similarity is defined as comparable X-ray diffraction diagrams.

The overall Si/Al ratio of the zeolites that are part of the composition of the catalysts according to the invention as well as the chemical composition of the samples are determined by X-ray fluorescence and atomic absorption.

The Si/Al ratios of the zeolites described above are those obtained upon synthesis according to the operational procedures described in the various documents cited or else obtained after post-synthesis dealuminization treatments that are well known to one skilled in the art, such as, and in a non-exhaustive list, hydrothermal treatments, that may or may not be followed by acid attacks or else direct acid attacks by solutions of mineral or organic acids.

The zeolites that are part of the composition of the catalysts according to the invention are calcined and exchanged by means of at least one treatment with a solution of at least one ammonium salt so as to obtain the ammonium form of the zeolites which, once calcined, produce the hydrogen forms of said zeolites.

The zeolites that are part of the composition of the catalyst according to the invention are at least partially and preferably completely in acid form, i.e., in hydrogen form ($H^+$). The Na/T atomic ratio is generally less than 10% and preferably less than 5%, and even more preferably less than 1%, whereby T is an atom that belongs to the group made up of silicon (Si), boron (B), gallium (Ga), and iron (Fe).

The catalyst that is the object of the invention contains at least one zeolite selected from among the group made up of the zeolites ZSM-48, EU-2, EU-11, and ZBM-30 or any possible combinations of the latter mixed with at least one matrix, which forms a substrate, and at least one hydro-dehydrogenating element, which is a noble metal of Group VIII.

Hereinafter, the term substrate will be used to refer to the zeolite+matrix mixture. Preferably, before the noble metal is introduced at the level of the zeolite, the substrate is shaped.

The matrix is selected from among the group composed of, for example, alumina, magnesia, amorphous silica-aluminas, natural clays (kaolin, bentonite, sepiolite, attapulgite), silica, titanium oxide, boron oxide, zirconia, aluminum phosphates, titanium phosphates, zirconium phosphates, carbon, and mixtures thereof Shaping can be done by, for example, extrusion, pelletizing, sugar-coating, or, more generally, any techniques that are known to one skilled in the art can be used.

The zeolite content in the substrate is generally between 0.5 and 99.9%, and advantageously between 5 and 90% by weight.

The catalyst according to the invention also contains at least one catalytic element (metal) having a hydro-dehydrogenating function, which is a metal or metal compound of Group VIII. The element of Group VIII is selected from among the group consisting of ruthenium, osmium, rhodium, iridium, platinum, and palladium, preferably selected from among the group consisting of rhodium, iridium, platinum and palladium, and more preferably selected from platinum or palladium. It is also possible to use a combination of several of said elements of Group VIII.

The noble-metal content in the catalyst is generally less than 10%, more particularly less than 5%, preferably less than 3%, and generally on the order of 0.5% to 1% by weight.

The dehydrogenating function as defined above should be introduced onto the substrate in such a way as to deposit said metal on the zeolite, more particularly on the outer surfaces of the crystals of the zeolite, and preferably in the mouths of pores.

The noble metal can be deposited on the substrate by any process that is known to one skilled in the art and that makes it possible to deposit the metal on the zeolite. It is possible to use the cation exchange technique with competition, where the competitor is preferably ammonium nitrate, whereby the competition ratio is at least approximately 20 and preferably approximately 30 to 200. In the case of platinum or palladium, it is common to use a tetramine complex of platinum or a tetramine complex of palladium: the latter will thus be deposited virtually completely on the molecular zeolite. This cation exchange technique can also be used to deposit the metal directly on the molecular sieve powder, before it is optionally mixed with a matrix.

Generally, solutions of the noble-metal cation complexes are suitable.

The placement of the metal at the level of the zeolite and, more specifically, on the outer surfaces of the crystals of the zeolite that is selected from among the group composed of the zeolites ZSM-48, EU-2, EU-11, and ZBM-30 can be visualized by the techniques of electron microscopy and the Castaing microprobe.

The dispersion of the metal can be measured by, for example, titration with hydrogen and oxygen. In the $H_2/O_2$ titration method, the element of Group VIII is first reduced, i.e., it is subjected to treatment under a hydrogen flux at high temperature under conditions such that all of the element's atoms that are accessible to hydrogen are transformed into metallic form. Then, an oxygen flux is sent in under operating conditions that ensure that all of the reduced-platinum atoms that are accessible to oxygen are oxidized into the oxide form of the element. By calculating the difference between the amount of oxygen introduced and the amount of oxygen that departs, it is possible to determine the amount of oxygen that is consumed. From this latter value it is possible to derive the amount of metal that is accessible to oxygen. The dispersion is then equal to the ratio of the amount of oxygen-accessible metal to the total amount of element in the catalyst.

Moreover, the metal precursor selected to be used to deposit the hydro-dehydrogenating metal also makes it possible to influence the dispersion that is obtained after the stages of calcination and reduction.

A catalyst that is preferred according to the invention contains at least a portion of the noble metal at the level of the matrix.

This fraction can be incorporated into the matrix (for example, in the form of an alumina gel) before it is mixed with the zeolite to form the substrate.

This fraction is preferably deposited on the matrix by treating the substrate with a solution of a noble-metal compound that is generally an anion complex.

The noble metal is then introduced onto the substrate at the level of the matrix by all methods known to one skilled in the art by, for example, at least one dry impregnation of a solution that contains the precursor salts of the metals selected from among Group VIII.

Use is preferably made of, for example, $Pt(NH_3)_4^{2+}$, $2Cl^-$, and $Pt(NH_3)_4^{2+}$, $2OH^-$ in the case of platinum and $Pd(NH_3)_4^{2+}$, $2Cl^-$ in the case of palladium, by dry impregnation.

This stage of deposition onto the matrix of the substrate can preferably be carried out before the noble metal is deposited on the zeolite. Before deposition onto the matrix, it is advantageous to carry out heat treatment, for example under air or oxygen, at a temperature of between 200° C. and 600° C., or 300° C. and 600° C., preferably between 250° C. 550° C. or 350° C. and 550° C., for a period of generally 30 minutes to 10 hours and preferably 1 to 4 hours so as to break down the salts of the metals that are deposited on the substrate and to obtain an oxide form of the metals.

It is also possible to deposit the noble metal on the matrix after it is deposited on the zeolite.

It is also possible to form an alumina gel and to mix it with the zeolite in the presence of at least a portion of the noble metal and then to extrude the substrate and, if need be, to deposit preferably at least part of the other portion of the noble metal on the zeolite.

In general, the invention also pertains to any process for treating hydrocarbon feedstocks with said catalyst according to the invention.

Before treating the hydrocarbon feedstocks, the catalyst should generally undergo treatment under hydrogen in order to transform the element of Group VIII into a metal and thereby to obtain an active metal phase. The procedure of this treatment under hydrogen includes, for example, a slow temperature rise (for example, between approximately 1 and 5° C./minute) under a stream of pure or diluted hydrogen up to a maximum reduction temperature of generally between approximately 300° C. and 700° C., preferably between approximately 300° C. and 700° C., preferably between approximately 300° C. and 650° C., followed by holding at this temperature for generally 1 to 10 hour(s) and preferably for 1 to 5 hour(s). This treatment under hydrogen can be carried out in situ in the catalytic dewaxing reactor or ex situ before the reactor is charged.

More particularly, the invention pertains to process for lowering the pour points of the hydrogen feedstocks with said catalyst.

The feedstocks that can be treated according to the process of the invention are advantageously fractions that have relatively high pour points whose values are desired to be reduced.

Typical feedstocks that can advantageously be treated according to the invention generally have pour points of above 0° C. The products that are produced by the treatment according to the process have pour points of less than 0° C. and preferably less than approximately −10° C.

The feedstock that is to be treated is paraffinic and in the majority of the cases contains paraffins with more than 10 carbon atoms, for example, a $C_{10}^+$ fraction. Its initial boiling point is generally greater than approximately 175° C.; it is preferably a heavy fraction with a boiling point of at least 280° C., and advantageously a boiling point of at least 380° C.

The feedstock is frequently composed of, among other things, linear and/or slightly branched paraffins that contain more than 10 carbon atoms, preferably 15–50 carbon atoms, and advantageously 15 to 40 carbon atoms. The heavy feedstocks (for making oils) contain paraffins that have significantly more than 30 carbon atoms, while the gas oils generally contain paraffins with 10 to 30 carbon atoms.

The process according to the invention is particularly well suited for treating paraffinic distillates such as the middle distillates, which include gas oils, kerosenes, jet fuels, vacuum distillates, and any other fractions whose pour points and viscosities have to be adjusted in order to fit the specifications.

The feedstocks that can be treated according to the process of the invention can contain paraffins, olefins, naphthenes, aromatic compounds, and also heterocyclic compounds, with a significant proportion of high-molecular-weight n-paraffins and very slightly branched paraffins, also of high molecular weight.

These feedstocks can have n-paraffin contents of more than 10 carbon atoms of high molecular weight, and very slightly branched paraffins with more than 10 carbon atoms, also of high molecular weight, whereby said values are greater than 30% and up to approximately 90%, or in certain cases greater than 90% by weight. The process is particularly advantageous when this proportion is at least 60% by weight.

As examples of other feedstocks that can be treated according to the invention, and in a non-limiting fashion, it is possible to mention bases for lubricating oils, synthetic paraffins produced by the Fischer-Tropsch process, high-pour-point poly-alpha-olefins, synthetic oils, middle distillates, vacuum residues, gas oils, middle distillates produced by FCC (LCO and HCO), and hydrocracking residues. The process can also be applied to other compounds that contain an n-alkane chain, as defined above, for example, n-alkyl-cycloalkane compounds, or that contain at least one aromatic group.

The feedstock to be treated preferably has a nitrogen-containing compound content of less than approximately 200 ppm by weight and preferably less than 100 ppm by weight. The sulfur content is less than 1000 ppm by weight, preferably less than 500 ppm, and even more preferably less than 200 ppm by weight. The metal content of the feedstock, such as Ni or V, is greatly reduced, i.e., less than 50 ppm by weight, preferably less than 10 ppm by weight, and even more preferably less than 2 ppm by weight. Thus, in the majority of cases, the feedstock has undergone at least one hydrotreatment before being subjected to the process according to the invention.

Thus, the process according to the invention makes it possible to improve the pour points of the hydrocarbon products (gas oils, oils . . . ), but also, in the case of oils, to improve their viscosity indices.

The operating conditions under which the process of the invention is carried out are as follows:
- the reaction temperature is between 170 and 500° C. and preferably between 180 and 470° C., and advantageously 190–450° C.;
- the pressure is between 1 and 250 bar, and preferably between 10 and 200 bar;
- the hourly volumetric flow rate (vvh, expressed in volume of feedstock injected per unit of volume of catalyst and per hour) is between approximately 0.05 and approximately 100, and preferably between approximately 0.1 and approximately 30 $h^{-1}$.

The feedstock and the catalyst are brought into contact in the presence of hydrogen. The rate of hydrogen used, expressed in liters of hydrogen per liter of feedstock, is between 50 and approximately 2000 liters of hydrogen per liter of feedstock and preferably between 100 and 1500 liters of hydrogen per liter of feedstock.

The following examples illustrate the invention without, however, limiting its scope.

EXAMPLE 1

Preparation of Catalyst C1 According to the Invention

The zeolite ZSM-48 that is used in this example is synthesized according to the operating procedure described in Volume 33, pages 282–284, of the series Studies in Surface Science and Catalysis, and in a large enough quantity to be able to prepare the different catalysts presented in the examples of this patent. The zeolite is then subjected to calcination under a stream of dry air for 9 hours at 550° C. so as to eliminate the organic structuring used to synthesize it. The catalyst then undergoes three cation exchanges by solutions of 5N ammonium nitrate at 100° C. for 3 hours apiece. The zeolite ZSM-48 in ammonium form that is thus obtained therefore has an Si/Al ratio of 57 and a sodium content of 38 ppm by weight.

The zeolite is mixed with an alumina gel that is peptized by nitric acid, at a ratio of 60% zeolite to 40% alumina gel. The paste that is thus obtained is run through a die plate that has cylindrical openings with a diameter of 1.4 mm. The extrudates are then dried for one night at 120° C. and then calcined at 550° C. under air for 2 hours.

Onto this substrate is deposited by dry impregnation an aqueous solution of $Pt(NH_3)_4^{2+}$, $2Cl^-$, such that the content of platinum deposited on the substrate is ultimately 0.45% by weight. The extrudates are then calcined under air at 550° C. The dispersion of the metal, measured by $H_2$—$O_2$ titration, is 43%. This preparation produces a catalyst for which the majority of the Pt is located at the level of the zeolite ZSM-48 (more than 90% of the metal is on the zeolite).

EXAMPLE 2

Preparation of Catalyst C2 According to the Invention

In this example, the substrate that is used is the same as that prepared in Example 1 before the noble metal is introduced. The difference in this example lies in the fact that the platinum is introduced onto the alumina and onto the zeolite ZSM-48: First of all, platinum is introduced mainly onto the alumina by carrying out an anion exchange using a solution of hexachloroplatinic acid. The extrudates are then calcined under air at 550° C. The metal content that is fixed is 0.15%. Then, 0.42% platinum, relative to the substrate, is introduced mainly on the zeolite ZSM-48 by dry impregnation using an aqueous solution of the platinum salt $Pt(NH_3)_4^{2+}$, $2OH^-$. The term mainly is defined as at least 90% of the metal, and generally at least 90%, or, most often, even approximately 99–100%. The overall dispersion of the Pt, measured by $H_2$—$O_2$ titration, is 52%.

EXAMPLE 3

Preparation of Catalyst C3 According to the Invention

In this example, the substrate that is used is the same as that used in Example 1 before any noble metal is introduced. The difference in this example relative to Example 2 lies in the fact that the platinum is introduced onto the alumina and the palladium onto the zeolite ZSM-48.

First, the vast majority of the platinum is introduced onto the alumina by carrying out an anion exchange using an aqueous solution of hexachloroplatinic acid $H_2PtCl_6$. The extrudates are then calcined under air at 550° C. The metal content that is fixed is 0.18% by weight. Then the vast majority of 0.36% by weight of palladium, relative to the substrate, is introduced at the level of the zeolite ZSM-48 by dry impregnation using an aqueous solution of the $Pt(NH_3)_4^{2+}$, $2OH^-$. The overall dispersion of the metals measured by $H_2$—$O_2$ titration is 39%.

EXAMPLE 4

Evaluation of Catalysts C2 and C3 by Hydroisomerization of n-C18

In this example the catalysts were evaluated by hydroisomerization of a mixture containing 2% mol of n-octadecane (n-C18) and 98% mol of n-heptane, whereby the latter is not transformed under the reaction conditions.

The reaction temperature is 233° C., and the H2/hydrocarbon molar ratio at the reactor inlet is 13 mol./mol. The spatial velocities are varied in such a way as to cover the largest possible conversion range. As is known to one skilled in the art, the catalysts were first reduced.

The catalytic results obtained are summarized in Table 1 below:

TABLE 1

|  | Catalysts According to | |
|---|---|---|
|  | C1 | C2 |
| Maximum yield of multibranched products with 18 carbon atoms (i-C18) % by weight | 50 | 51 |
| Yield in cracking products (having less than 18 carbon atoms (% by weight)) | 25 | 24 |

These results show that the catalysts according to the invention make it possible to achieve significant yields of isomerized, multibranched products having 18 carbon atoms.

EXAMPLE 5

Evaluation of Catalysts C1, C2, and C3 on a Hydrocracking Residue

Catalysts C1, C2, and C3 were evaluated for treating a hydrocracking residue produced from a vacuum distillate.

The characteristics of this feedstock are as follows:

| Sulfur content (ppm by weight) | 10 |
|---|---|
| Nitrogen content (ppm by weight) | 1 |
| Pour point (° C.) | +40 |
| Starting point | 281 |
| 10% | 345 |
| 50% | 412 |
| 90% | 470 |
| End point | 543 |

Catalysts C1, C2, and C3, whose preparation is described in Examples 1 and 2, respectively, are used to prepare a base oil from the above-described feedstock.

The catalysts are first reduced under hydrogen at 450° C. before the catalytic test in situ in the reactor. This reduction is done in stages. Said reduction consists of a stage at 150° C. for 2 hours, then a temperature rise to 450° C. at a rate of 1° C./minute, and then a plateau of 2 hours at 450° C. During this reduction protocol, the hydrogen flow rate is 1000 liters of $H_2$ per liter of catalyst.

In the case of catalyst C1, the reaction takes place at 330° C. under a total pressure of 12 MPa, an hourly volumetric flow rate of 1 $h^{-1}$, and a hydrogen flow rate of 1000 liters of $H_2$ per liter of feedstock. In the case of catalyst C2, the reaction takes place at 325° C., while the other operating conditions are otherwise identical to those used to test catalyst C1. In the case of catalyst C3, the reaction takes place at 330° C., while the other operating conditions are otherwise identical to those used to test catalyst C1.

The characteristics of the oil that is obtained, fraction 380° C.+, are presented in Table 2, below.

|  | Catalyst C1 | Catalyst C2 | Catalyst C3 |
|---|---|---|---|
| Viscosity index VI of the fraction 380° C.+ | 127 | 129 | 128 |
| Pour point (° C.) | −21 | −19 | −20 |
| Oil yield (380° C.+) (% by weight) | 79.6 | 78.9 | 79.3 |

These examples show the importance of utilizing the catalysts according to the invention, which make it possible to lower the pour point of the starting feedstock in the case of a hydrocracking residue while at the same time retaining a high viscosity index (VI).

What is claimed is:

1. An extruded catalyst containing at least one matrix, at least one noble metal of Group VIII and at least one zeolite selected from the group consisting of ZSM-48, EU-2, EU-11, and ZBM-30, all of said noble metal being distributed such that at least 10% and less than 100% of said noble metal is superposed on outer surfaces of crystals of said at least one zeolite and the remainder of said noble metal is superposed on said at least one matrix.

2. A catalyst according to claim 1, wherein the noble metal is selected from the group consisting of palladium, platinum, iridium, and rhodium.

3. A catalyst according to claim 1, wherein the matrix is alumina.

4. A catalyst according to claim 2, wherein the matrix is alumina.

5. A process for preparing a catalyst according to claim 1 that includes at least one matrix, at least one noble metal from Group VIII, and at least one zeolite selected from the group consisting of ZSM-48, EU-2, EU-11, and ZBM-30, said process comprising a) preparing an extruded substrate is by mixing at least one matrix and at least one of said zeolites, and then extrusion b) dry impregnating a solution of at least one cation complex of said metal on said substrate in order to deposit said noble metal on the outer surface of crystals of the zeolite; and c) optionally subjecting the substrate containing said noble metal depositing at the zeolite to heat treatment.

6. A process according to claim 5, wherein not all of the noble metal is used in stage b), said process further comprising a stage b') comprising depositing the remaining portion of the noble metal on the matrix by bringing said matrix into contact with a solution of at least one anionic complex of said noble metal.

7. A process according to claim 6, wherein stage b') is conducted before stage b).

8. A process according to claim 7, comprising heat treating a resultant intermediate product obtained from stage b').

9. A process according to claim 6, in which stage b') is carried out before stage b).

10. A process according to claim 5, wherein the noble metal is deposited directly on a zeolite powder before being mixed with the matrix.

11. In a process for conducting a catalytic conversion of hydrocarbons, comprising reacting said hydrocarbon in the contact with a catalyst, the improvement wherein the catalyst is in accordance with claim 1.

12. A process according to claim 11 for lowering the pour points of hydrocarbon feedstocks.

13. A process according to claim 12, in which the hydrocarbon feedstock has an initial boiling point of greater than 175° C., a nitrogen-compound content of less than 200 ppm by weight, a sulfur content of less than 1000 ppm by weight, and a metal content of less than 50 ppm by weight, and conducting the process at a temperature of 170–500° C., under 1 to 250 bar, with an hourly volumetric flow rate of 0.05 to 100 $h^{-1}$, and in the presence of 50 to 2000 liters of hydrogen/liter of feedstock.

14. A process according to claim 13, wherein the group VIII metal is at least one of platinum and palladium.

15. A catalyst prepared in accordance to the process of claim 5.

16. A catalyst prepared in accordance to the process of claim 6.

17. A catalyst prepared in accordance to the process of claim 7.

18. A catalyst prepared in accordance to the process of claim 8.

19. A catalyst prepared in accordance to the process of claim 15.

20. A catalyst according to claim 1, wherein at least 20% of the noble metal is superposed on outer surfaces of crystals of said at least one zeolite.

21. A catalyst according to claim 1, wherein at least 90% of the noble metal is superposed on outer surfaces of crystals of said at least one zeolite.

* * * * *